(12) United States Patent
Moser et al.

(10) Patent No.: US 11,697,254 B2
(45) Date of Patent: Jul. 11, 2023

(54) PEEL PLY FOR ELONGATE COMPOSITE MATERTALS

(71) Applicants: Hexcel Composites Limited, Duxford (GB); Hexcel Holding GMBH, Pasching (AT); Hexcel Corporation, Dublin, CA (US)

(72) Inventors: Johannes Moser, Linz (AT); Yu-Chen Hung, Royston (GB); Erin Reagan, Windsor, CO (US)

(73) Assignees: Hexcel Composites Limited, Duxford (GB); Hexcel Corporation, Dublin, CA (US); Hexcel Holding GmbH, Pasching (AT)

( * ) Notice: Subject to any disclaimer, the term of this patent is extended or adjusted under 35 U.S.C. 154(b) by 160 days.

(21) Appl. No.: 17/602,095

(22) PCT Filed: Apr. 2, 2020

(86) PCT No.: PCT/EP2020/059469
§ 371 (c)(1),
(2) Date: Oct. 7, 2021

(87) PCT Pub. No.: WO2020/207905
PCT Pub. Date: Oct. 15, 2020

(65) Prior Publication Data
US 2022/0212424 A1    Jul. 7, 2022

(30) Foreign Application Priority Data

Apr. 11, 2019 (GB) ..................... 1905144

(51) Int. Cl.
*B29C 70/52* (2006.01)
*B29C 70/54* (2006.01)
*B29C 70/68* (2006.01)

(52) U.S. Cl.
CPC ............ *B29C 70/525* (2013.01); *B29C 70/54* (2013.01); *B29C 70/682* (2013.01)

(58) Field of Classification Search
CPC .................................................. B29C 70/525
See application file for complete search history.

(56) References Cited

U.S. PATENT DOCUMENTS 4,783,362 A * 11/1988 Thornton ............. D03D 15/275
428/408
4,824,507 A 4/1989 D'Amico
(Continued)

FOREIGN PATENT DOCUMENTS

EP          3124219 A1    2/2017
WO   WO-2014/079456 A1 *  5/2014

OTHER PUBLICATIONS

Search Report under Section 17(5), issued in a related Great Britain Application, Application No. GB1818937.3, dated May 22, 2019.
(Continued)

*Primary Examiner* — Jeffry H Aftergut
(74) *Attorney, Agent, or Firm* — W. Mark Bielawski

(57) ABSTRACT

An assembly (113) for composite manufacture is provided. The assembly comprises a cured resin impregnated reinforcement material (112) comprising a fibre component and a resin matrix component, in which the resin matrix component comprises polyurethane, the assembly having a length to width ratio of at least 5:1, and the assembly defining a longitudinal direction (L) along its length; and a peel ply (116) in contact with the cured resin impregnated reinforcement material (112), the peel ply (116) comprising a woven layer having a plurality of longitudinal fibres (118) extending in the longitudinal direction (L); and a plurality of transverse fibres (120) extending in a transverse direction (T) normal to the longitudinal direction (L); in which the
(Continued)

Figure 1:
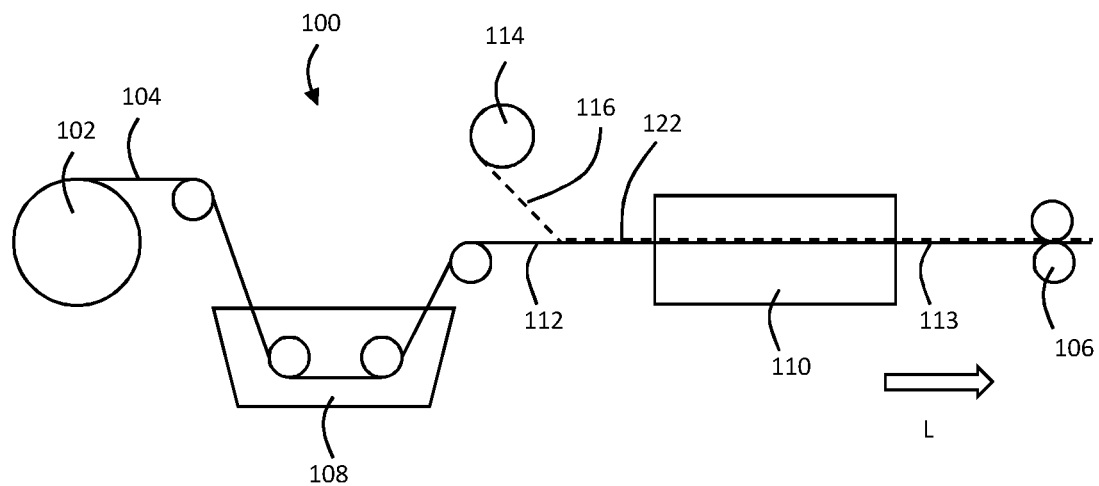

areal density of the plurality of transverse fibres (120) is higher than the areal density of the plurality of longitudinal fibres (118).

14 Claims, 3 Drawing Sheets

(56) References Cited

U.S. PATENT DOCUMENTS

| | | | | |
|---|---|---|---|---|
| 2005/0179160 A1* | 8/2005 | Moreau | ............... | B29C 70/302 |
| | | | | 264/293 |
| 2013/0129957 A1* | 5/2013 | Zhao | ............... | H04W 76/10 |
| | | | | 428/40.1 |
| 2018/0200752 A1 | 7/2018 | Gerolymos | | |

OTHER PUBLICATIONS

International Search Report (ISR) and Written Opinion (WO), issued in the parent Patent Cooperation Treaty (PCT), Application No. PCT/EP2020/059469, dated Jul. 28, 2020.

\* cited by examiner

PEEL PLY FOR ELONGATE COMPOSITE MATERIALS

The present invention is concerned with a peel ply. More specifically, the present invention is concerned with a peel ply for elongate composite material substrates.

In composite manufacture, it is common to form "intermediate products". By this, we mean products which have undergone some manufacturing steps, but are not yet a fully formed final product. One such example is in composite pultrusion. In pultrusion, a fibre reinforcement is fed from a roll, through a resin bath or other apparatus where it is impregnated with a thermoplastic or thermoformable resin, through a heater and die to a set of rollers which apply the required tension, or "pull". The intermediate product produced by this process is a continuous profile which may be cut into individual lengths and e.g. attached to further layers to form a final product.

Pultrusion tends to form elongate intermediate products of constant cross-section. By "elongate" we mean products having a length of at least 5 times the largest dimension of the cross-section. In the case of planar or flat intermediate product, this is a length to width ratio of at least 5:1. In many cases, the length to width ratio will be greater than 100:1, for example 50m long strips of material which are 120 mm wide (417:1) are not unheard of. In such pultruded composite materials, the fibres are predominantly (equal to, or more than 50%) oriented along the long axis (i.e. at zero degrees).

There are other method of producing elongate products (e.g. resin transfer moulding, open moulding), but for constant cross-section, pultrusion is particularly efficient.

Throughout the present application, the "length" of a product along a "longitudinal axis" is defined as in the "long" direction, e.g. in the case of pultrusion the direction in which the product is pulled. To put it another way, in intermediate products with a constant cross-section, the length is the direction normal to the cross-section.

If the intermediate product is to be bonded to a further intermediate product (for example to form a product comprising two layers of pultruded composite), it is important to take care of the bonding surface (i.e. the surface to which the further intermediate product it to be attached). It is generally desirable to reduce contamination of the bonding surface, but also to roughen it to enhance any mechanical bonding effect which may take place between the intermediate product and the further intermediate product.

These aims are commonly achieved using a peel ply. The peel ply is a strip of flexible material which is placed into contact with a bonding surface of an intermediate product, for example as it comes off the production line. It may be placed into contact with the intermediate product when the resin it still tacky, and may thus be impressed into the surface to form a roughened bonding surface. For pultruded materials the peel ply may be attached before the pultrusion step so that it becomes incorporated into the pultruded material as a removable outer layer.

Peel ply is typically constructed from a woven material. Peel ply is typically provided as an elongate material (like the intermediate product) and thus has a length or longitudinal direction as well as a transverse direction normal to the longitudinal direction across its width. The woven peel ply comprises a plurality of fibres running in the longitudinal direction, and a plurality of fibres running in the transverse direction. Typically, the peel ply is woven with warp fibres in the longitudinal direction, and weft fibres in the transverse direction.

When a user wishes to remove the peel ply, it can be peeled from the intermediate product. However, during the process of releasing peel ply from a substrate of intermediate composite material, there is a tendency to tear the peel ply and leave traces of the peel ply behind. This tendency is particularly marked when the resin of the composite material is a polyurethane resin. Such traces of peel ply can interfere with the bonding of the composite material to other surfaces, and they must therefore be removed before the intermediate product can be adhered to a further intermediate product. This increases time and complexity in a production environment and is not desirable. Furthermore, the peel ply tends to break across its width (i.e. transverse to the direction of peel). This tendency interrupts the process of removal, and prevents the peel ply from being removed quickly and effectively in a single, long strip.

Increasing peel ply areal weight by increasing the weave density (equally in both longitudinal and transverse directions) and/or the linear density of the fibres can increase the tear strength, but this can also cause the peel ply surface to become too smooth (because the fibres are too close together), thus negatively impacting the roughening effect on the composite bonding surface. Reducing the surface roughness of the bonding surface due to increased areal weight of the peel ply can also result in low mode I fracture energy (based on G1C testing) for bonded substrates. This is also not desirable.

The present invention aims to obviate or at least mitigate the above described problems and/or to provide improvements generally.

According to the invention there is provided an assembly for composite manufacture, a method of forming an assembly for composite manufacture and a method of preparing an elongate composite substrate as defined in any one of the accompanying claims.

The present invention provides an assembly for composite manufacture, the assembly comprising:
  a cured resin impregnated reinforcement material comprising a fibre component and a resin matrix component, in which the resin matrix component comprises polyurethane, the assembly having a length to width ratio of at least 5:1, and the assembly defining a longitudinal direction along its length; and,
  a peel ply in contact with the cured resin impregnated reinforcement material, the peel ply comprising a woven layer having:
    a plurality of longitudinal fibres extending in the longitudinal direction; and,
    a plurality of transverse fibres extending in a transverse direction normal to the longitudinal direction;
    in which the areal density of the plurality of transverse fibres is higher than the areal density of the plurality of longitudinal fibres.

The present invention further provides a method of forming an assembly for composite manufacture comprising the steps of:
  providing a reinforcement material component and a resin matrix component, in which the resin matrix component comprises polyurethane, the reinforcement material having a length to width ratio of at least 5:1, the reinforcement material defining a longitudinal direction (L) along its length and a transverse direction (T) normal to the longitudinal direction (L);
  providing a peel ply as defined herein;
  impregnating the reinforcement material component with the resin matrix component to form a resin impregnated reinforcement material;

attaching the peel ply to a contact surface of the resin impregnated reinforcement material;
and curing.

The present invention also provides a method of preparing an elongate composite substrate comprising the steps of:
providing an assembly according to the present invention; and
peeling the peel ply from the assembly in the longitudinal direction.

By increasing transverse fibre average areal density, the tear strength of the peel ply is increased, and it is therefore less prone to breakage during releasing. Equally, by only increasing the transverse fibre areal density in the longitudinal direction, the substrate surface after peel ply release maintains most of its coarseness for a secondary bonding application. The applicant has realised that the problem of damage to the peel ply when peeling from composites with a polyurethane matrix is particularly problematic, and the present invention provides surprising and significant benefits in this context.

By increasing the areal density of transverse fibres in a peel ply, peel ply tear strength can increase to a similar level as that achieved by increasing overall areal weight (for example by increasing general weave density) and fracture toughness on bonded substrates can be retained or the reduction minimized.

In the peel ply for use in the present invention, the areal density of the plurality of transverse fibres is higher than the areal density of the plurality of longitudinal fibres. By the areal density of the plurality of transverse fibres is meant the product of the number of transverse fibres in a unit length of the peel ply measured in the longitudinal direction times the linear density of the transverse fibres. Similarly, by the areal density of the plurality of longitudinal fibres is meant the product of the number of longitudinal fibres in a unit length of the peel ply measured in the transverse direction times the linear density of the longitudinal fibres. The unit length over which the number of fibres is counted may be any chosen length, so long as the same length is chosen for each direction of fibre; for example, the number of transverse fibres in 10 mm measured in the longitudinal direction of the peel ply can be compared to the number of longitudinal fibres in 10 mm measured in the transverse direction of the peel ply. The linear density of the plurality of the fibres in each direction can also be measured in any units, so long as the same units are used for each measurement, for example the weight in grams per 10 km of each individual fibre (dtex) may be used.

Preferably, the areal density of the plurality of transverse fibres is at least 5% greater than the areal density of the plurality of longitudinal fibres; more preferably the areal density of the plurality of transverse fibres is from 5% to 50% greater than the areal density of the plurality of longitudinal fibres; and even more preferably the areal density of the plurality of transverse fibres is from 10% to 40% greater than the areal density of the plurality of longitudinal fibres.

It will be appreciated that the differences in areal density may be achieved in a number of ways. For example, in a first preferred arrangement, the linear densities of the fibres in each direction may be the same and the number of transverse fibres per unit length in the longitudinal direction may be higher than the number of longitudinal fibres per unit length in the transverse direction. Conversely, in an alternative preferred arrangement, the number of fibres per unit length in each direction may be the same and the linear density of the transverse fibres may be greater than the linear density of the longitudinal fibres.

In a further possible arrangement within the present invention, both the number of transverse fibres per unit length in the longitudinal direction is higher than the number of longitudinal fibres per unit length in the transverse direction and the linear density of the transverse fibres is greater than the linear density of the longitudinal fibres.

In yet further arrangements within the invention, the number of longitudinal fibres per unit length in the transverse direction may be higher than the number of transverse fibres per unit length in the longitudinal direction, so long as the linear density of the transverse fibres is sufficiently greater than the linear density of the longitudinal fibres such that the areal density of the plurality of transverse fibres is at least 5% greater than the areal density of the plurality of longitudinal fibres. In a converse arrangement, the linear density of the longitudinal fibres may be greater than the linear density of the transverse fibres, so long as the number of transverse fibres per unit length in the longitudinal direction is sufficiently higher than the number of longitudinal fibres per unit length in the transverse direction such that the areal density of the plurality of transverse fibres is at least 5% greater than the areal density of the plurality of longitudinal fibres.

In a preferred embodiment of the invention there are a higher number of transverse fibres per unit length in the longitudinal direction than the number of longitudinal fibres per unit length in the transverse direction. In this embodiment, the linear densities of the fibres in each direction are selected so that they are the same or so that any difference therein does not outweigh the effect of the difference in numbers on the ratio of areal densities.

In this embodiment, preferably the ratio of the number of transverse fibres per unit length in the longitudinal direction to the number of longitudinal fibres per unit length in the transverse direction is from 1.5:1 to 1.05:1, more preferably from 1.4:1 to 1.1:1, even more preferably from 1.3:1 to 1.15:1.

In a further preferred embodiment of the invention, the linear density of the transverse fibres is greater than the linear density of the longitudinal fibres. This embodiment, may be an alternative or may be additional to the above preferred embodiment, so that in this embodiment the numbers of fibres in each direction are selected so that they are the same or so that any difference therein does not outweigh the effect of the differences in the linear densities on the ratio of areal densities.

In this embodiment, preferably the linear density of the transverse fibres is from 110 to 200% of the linear density of the longitudinal fibres, more preferably from 125 to 175%.

The actual values for the numbers and linear densities of the longitudinal and transverse fibres used to form the peel plies used in the present invention may be selected from any convenient values so long as the necessary ratio of areal density is achieved and so that the peel plies have sufficient physical integrity to function, and those skilled in the art will easily be able to select suitable values. However, in particularly suitable peel plies the number of transverse fibres in the longitudinal direction is from 10 to 50 per 10 mm, preferably from 10 to 40 per 10 mm, more preferably from 15 to 30 per 10 mm; and/or the number of longitudinal fibres in the transverse direction is from 10 to 50 per 10 mm, preferably from 10 to 40 per 10 mm, more preferably from 15 to 30 per 10 mm. Similarly, in particularly suitable peel plies the dtex of the transverse fibres is from 100 to 500, preferably from 150 to 400; and/or the dtex of the longitudinal fibres is from 100 to 500, preferably from 150 to 400.

Peel plies for use in the present invention preferably have an average overall areal mass of 50 to 200 g/m$^2$, more preferably from 75 to 175 g/m$^2$.

The fibres of the peel plies suitable for the present invention may be formed from any convenient materials such as polyester, but we have found that peel plies formed from polyamides and nylon are particularly suitable for use in combination with elongate assemblies in which the resin matrix comprises polyurethane, both in terms of ease of release without breaking and formation of a surface suitable for bonding. Thus, in particularly preferred embodiments of the present invention, the fibres of the peel plies are formed from polyamide or nylon.

The fibres of the peel plies suitable for the present invention may be formed from the same materials, with the only differences being in the numbers and/or the linear densities of the longitudinal and transverse fibres, or the transverse fibres may be constructed from different materials to the longitudinal fibres.

The peel plies for use in the present invention may be formed in any convenient manner, but preferably the longitudinal fibres are warp fibres and the transverse fibres are weft fibres.

In assemblies according to the present invention, the peel ply is preferably at least partially embedded in the matrix of the elongate component. This may be achieved in any convenient manner, for example the peel ply may be applied to the resin impregnated reinforcement material before the resin is cured. This is particularly suitable when the assembly is produced by pultrusion, in which case the peel ply is applied to the resin impregnated reinforcement material before the pultrusion step.

The assembles of the present invention may be of any size and shape, so long as the length is at least 5 times the width, for example length to width ratios of greater than 500:1 are suitable and lengths of 50 m or more are also suitable. In particularly preferred embodiments, the assembly is a pultruded product.

The assemblies according to the present invention are preferably formed by pultrusion. Any suitable method of pultrusion may be used to produce the assemblies of the invention.

In the processes of the present invention the peel ply is preferably applied to the resin impregnated reinforcement material before or at the same time as the curing step. For example, the resin component may be applied to the reinforcement material and impregnated therein, and the peel ply may then be applied to a contact surface of the resin impregnated reinforcement material, which is then cured, for example by pultrusion.

In a particularly preferred embodiment of the process of the invention, the peel ply is applied to the reinforcement material before the resin is impregnated into the reinforcement material, and the resin impregnation and curing steps are subsequently carried out substantially simultaneously, for example by passage through a pultrusion die, so that the peel ply becomes incorporated into the outer layer of the cured resin impregnated reinforcement material.

Figure 2:
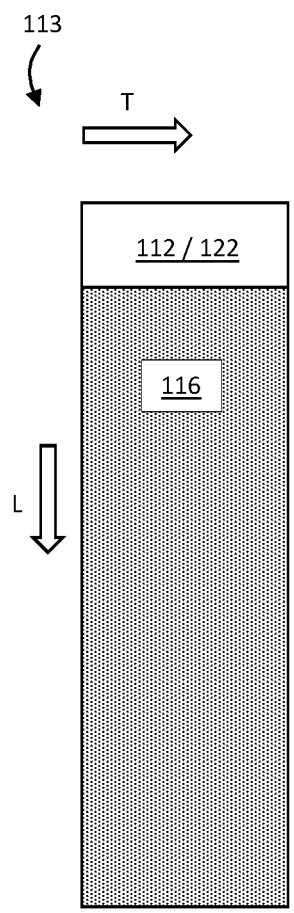
Figure 3:
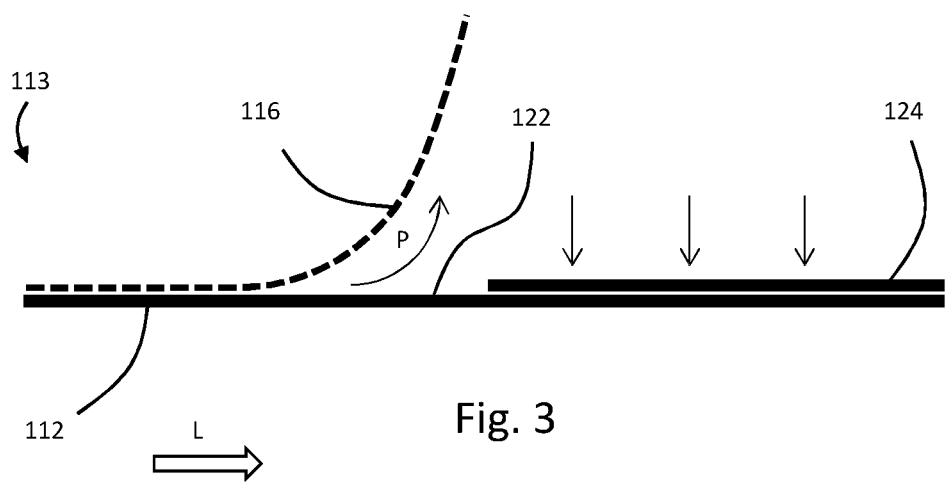
Figure 4:
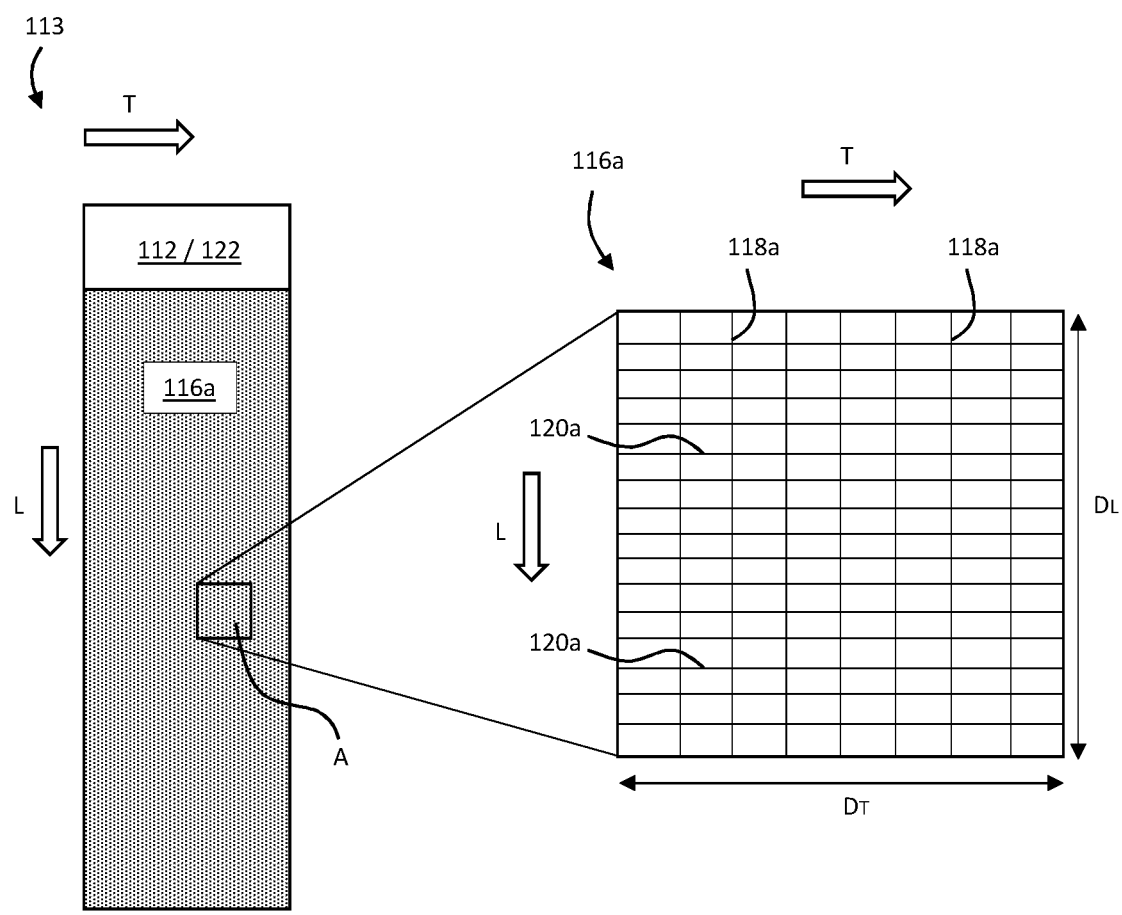
Figure 5:
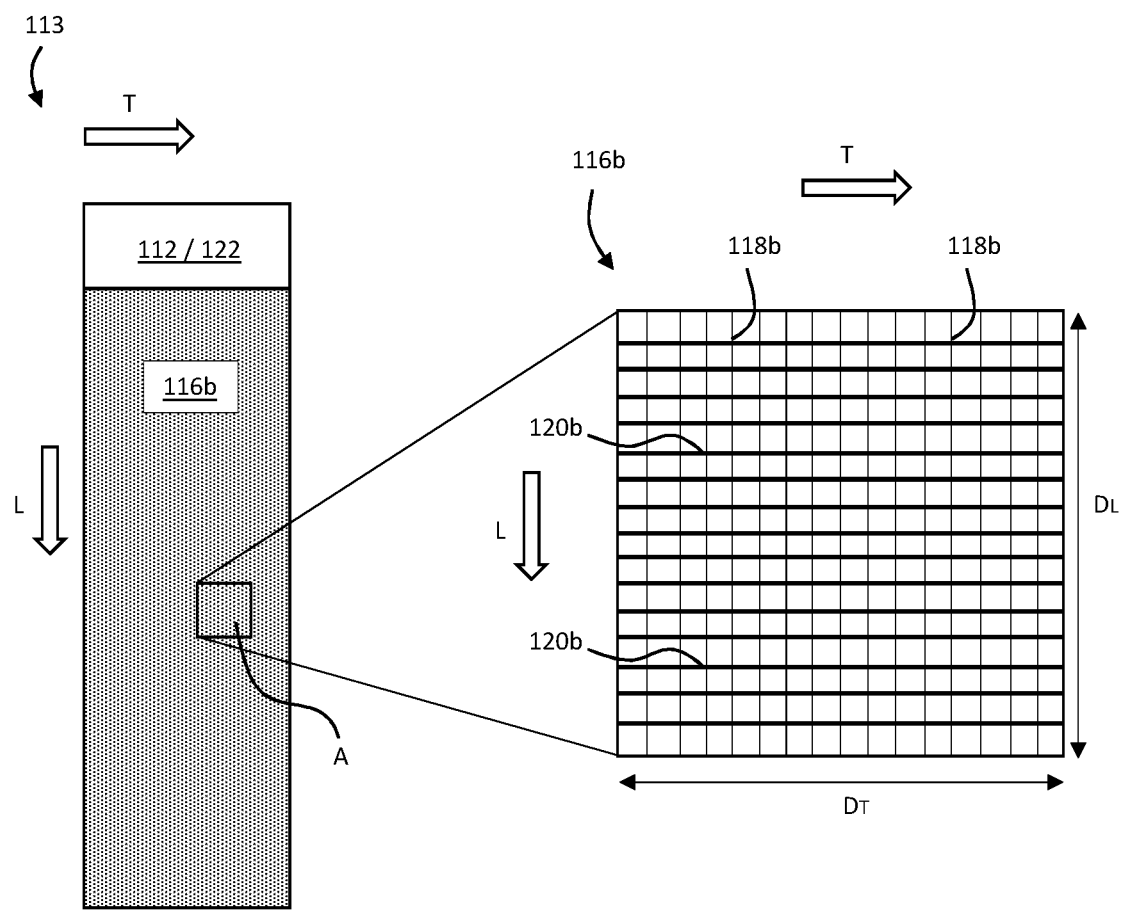

Example of the present invention are provided in the accompanying Figures in which:

FIG. 1 is a schematic view of a known pultrusion process;
FIG. 2 is a plan view of an example assembly of a pultruded intermediate product and peel ply;
FIG. 3 is a side view of a step in preparing the pultruded intermediate product of FIG. 2 for subsequent use;
FIG. 4 is a view similar to that of FIG. 2, showing a detailed portion of a first embodiment of the present invention; and
FIG. 5 is a view similar to that of FIG. 2, showing a detailed portion of a second embodiment of the present invention.

Referring to FIG. 1, a known pultrusion process 100 is shown in which a roll 102 of fibre reinforcement material 104 is pulled by a pair of rollers 106. The reinforcement material 104 is passed through a resin bath 108 to form resin impregnated reinforcement material 112, before being cured and formed in a heated die 110. The result is an elongate intermediate product of constant cross-section comprising a fibre reinforcement impregnated with a cured resin matrix.

A roll 114 of peel ply 116 is provided upstream of the heated die 110 but after the resin bath 108. The peel ply 116 is placed into contact with a contact surface 122 of the resin impregnated reinforcement material 112 and adheres to the contact surface 122 of the resin impregnated reinforcement material 112 as it passes through the heated die, so that the peel ply 116 is partially embedded in the outer layer of resin and forms a removable upper layer in an assembly 113 comprising the elongate intermediate product and the peel ply 116.

In known prior art processes a conventional peel ply is used; however, in the present invention a peel ply 116 as described herein is used.

The peel ply for use in the present embodiment is constructed from nylon, although it may also be constructed from a polyamide or polyester.

The longitudinal direction L (which is also the process direction) is shown in FIG. 1.

Referring to FIG. 2, an assembly 113 of cured resin impregnated reinforcement material 112 and peel ply 116 attached thereto is shown in plan. In known assemblies a conventional peel ply is used, but in the present invention, the peel ply 116 may be provided in a number of different forms, examples of which are discussed with respect to FIGS. 4 and 5 below.

Referring to FIG. 3, a method of subsequently processing an assembly 113 is shown. The peel ply 116 is peeled from the contact surface 122 of the cured resin impregnated reinforcement material 112 in direction P, and this removes the upper layer of cured resin associated with the peel ply 116 after curing. Following removal of the peel ply 116 the contact surface 122 has the requisite surface roughness so as to form a suitably strong bond when attached to a further intermediate product 124 (which e.g. may be a further layer of composite material).

Referring to FIG. 4, an assembly 113 according to a first embodiment of the present invention is shown in plan, with a peel ply 116*a* according to a first embodiment attached to the contact surface 122 of the cured resin impregnated reinforcement material 112. A detail area A of the peel ply 116*a* is shown. It should be noted that the spacing between the fibres 118*a*, 120*a* of the peel ply 116*a* is not shown to scale in this figure, rather the spacing is exaggerated to more clearly illustrate the invention.

The peel ply 116*a* comprises a plurality of longitudinal fibres 118*a* which extend in the longitudinal direction L (i.e. lengthwise) and a plurality of transverse fibres 120*a* which extend in a transverse direction T, being normal or perpendicular to the longitudinal direction (i.e. cross-wise). In this embodiment, the peel ply 116*a* is woven with the longitudinal fibres 118*a* as the warp fibres, and the transverse fibres 120a as the weft fibres, but the invention is not so limited. It is envisaged that the longitudinal fibres 118a could be the weft fibres, and the transverse fibres 120a could be the warp fibres.

A specific unit distance is labelled as DL in the longitudinal direction and as DT in the transverse direction in FIG. 4, and it is noted that the peel ply 116a is generally homogenous (i.e. this section is representative of the entire peel ply). In this embodiment the linear density of the fibres in each direction is the same (dtex 233) but the number of transverse fibres 120a per unit distance in the longitudinal direction DL is greater that the number of longitudinal fibres 118a per unit distance in the transverse direction DT. Specifically, in this example the number of transverse fibres 120a per unit distance in the longitudinal direction DL is 25 per 10 mm and the number of longitudinal fibres 118a per unit distance in the transverse direction DT is 20 per 10 mm, so that there are 25% more transverse fibres 120a per unit distance than longitudinal fibres 118a per unit distance, i.e. the ratio of transverse fibres per unit length in the longitudinal direction to the number of longitudinal fibres in the transverse direction is 1.25:1. This ratio has been found to provide a balance of properties including good release (low peel off strength and clean surface) and good surface adhesion (high G1c).

In this embodiment, the longitudinal and transverse fibres are constructed from the same material, preferably a polyamide or nylon, but other material types are envisaged.

Referring to FIG. 5, an assembly 113 in accordance with a second embodiment of the present invention is shown in plan, with a peel ply 116b according to a second embodiment attached to the contact surface 122 of a cured resin impregnated reinforcement material 112. A detail area A of the peel ply 116b is shown.

The peel ply 116b comprises a plurality of longitudinal fibres 118b which extend in the longitudinal direction L (i.e. lengthwise) and a plurality of transverse fibres 120b which extend in a transverse direction being normal or perpendicular to the longitudinal direction (i.e. cross-wise). In this embodiment, the peel ply 116b is woven with the longitudinal fibres 118b as the warp fibres, and the transverse fibres 120b as the weft fibres, but the invention is not so limited.

A specific unit distance in the longitudinal direction DL and transverse direction DT is shown in FIG. 5, with DL being equal to DT, and it is noted that the peel ply 116b is generally homogenous (i.e. this section is representative of the entire peel ply). In this embodiment the number of transverse fibres 120b per unit distance in the longitudinal direction DL is the same as the number of longitudinal fibres 118b per unit distance in the transverse direction DT (25 per 10 mm in both directions), but the fibres 120b running in the transverse direction DT are of a linear higher density than the linear density of the fibres 118b running in the longitudinal direction DL. Specifically, the transverse fibres 120b have a dtex of 350 and the longitudinal fibres 118b have a dtex of 233, i.e. the linear density of the transverse 120b fibres is 150% of the linear density of the longitudinal fibres 118a.

The invention is further illustrated by the results shown in Table 1 below. The results were generated by preparing a number of samples of pultruded materials incorporating various peel ply materials, as listed below. The pultrusion samples were produced using carbon fibre reinforcement and a polyurethane resin, and following curing samples were cut from the pultruded material and tested for various properties.

The force required to peel the peel ply from the sample (N/cm) was measured using a test methodology based on ASTM D3330 using pultrusion samples of 500 mm length, 50 mm width and 5 mm thickness and a peel off angle close to 180°.

The strength of the bond formed when the pultruded sample is bonded to a glass fibre reinforced laminate following removal of the peel ply was determined by measuring the fracture energy (G1c in $J/m^2$) in a methodology based on ASTM D5528 using pultrusion samples of 200 mm length, 20 mm width and 5 mm thickness.

The degree of breakage during peel ply removal and the amount of unremoved peel ply scraps was determined by visual inspection using pultrusion samples of 105 mm width, 5 mm thickness and lengths of at least 1 m up to 10 m.

Comparative Example 1: Peel ply PA66105 (available from Zhejiang Youwei New Materials Co. Ltd, China); longitudinal fibres (warp fibres) 20 per cm, dtex 233; transverse fibres (weft fibres) 20 per cm, dtex 233.

Example 1: Peel ply PA66120 (available from Zhejiang Youwei New Materials Co. Ltd, China); longitudinal fibres (warp fibres) 20 per cm, dtex 233; transverse fibres (weft fibres) 25 per cm, dtex 233.

Comparative Example 2: Peel ply 3133B (available from James Dewhurst Limited, UK); longitudinal fibres (warp fibres) 44 per cm, dtex 78; transverse fibres (weft fibres) 34 per cm, dtex 78.

Comparative Example 3: Peel ply 56137-061 (available from Precision Fabrics Group, USA); longitudinal fibres (warp fibres) 25 per cm, dtex 222; transverse fibres (weft fibres) 20 per cm, dtex 222, including release coating.

Comparative Example 4: Peel ply 56137-061 (available from Precision Fabrics Group, USA); longitudinal fibres (warp fibres) 25 per cm, dtex 222; transverse fibres (weft fibres) 20 per cm, dtex 222, no release coating.

Example 2: Peel ply 86002-080 (available from Precision Fabrics Group, USA); longitudinal fibres (warp fibres) 27.5 per cm, dtex 233; transverse fibres (weft fibres) 20 per cm, dtex 350.

As may be seen, the material of Comparative Example 1 has the same weave density and the same linear density for both the longitudinal and transverse fibres, and therefore the average areal density is the same in each direction. In Comparative Examples 2, 3 and 4 the number of longitudinal fibres in a set distance is greater than the number of transverse fibres in the set distance, whilst the linear density of the longitudinal and transverse fibres is the same in each material. Therefore, the average areal density of the transverse fibres is lower than the average areal density of the longitudinal fibres. Comparative Example 3 also incorporates a release coating which is not present in any of the other Examples.

In contrast, in the material of Example 1, whilst the linear density (dtex) of the longitudinal fibres is the same as the linear density of the transverse fibres, the number of transverse fibres in a set distance is greater than the number of longitudinal fibres in the set distance, and therefore the average areal density of the transverse fibres is higher than the average areal density of the longitudinal fibres.

Similarly, in the material of Example 2, although the number of longitudinal fibres in a set distance is greater than the number of transverse fibres in the set distance, the linear density (dtex) of the transverse fibres is significantly greater than the linear density of the longitudinal fibres, and this difference is sufficient that the average areal density of the transverse fibres is higher than the average areal density of the longitudinal fibres.

TABLE 1

|  | Comparative Example 1 | Example 1 | Comparative Example 2 | Comparative Example 3 | Comparative Example 4 | Example 2 |
|---|---|---|---|---|---|---|
| Peel off N/cm | 5-7 | 5-7 | 4.5 | 1.1 | 5-7 | 5-7 |
| G1c J/m$^2$ | 600-1000 | 600-1000 | 260-490 | 29-175 | 170-300 | 600-1000 |
| Breakage | Poor | Excellent | N/A | N/A | N/A | Excellent |

As shown in Table 1, although the standard prior art material of Comparative Example 1 had reasonable peel off values and formed an excellent bond after removal of the peel ply (as shown by the high fracture energy) it showed poor performance with respect to breakage, and removal of the peel ply lead to the presence of numerous scraps of peel ply requiring manual removal. In contrast, whilst the prior art materials of Comparative Examples 2 and 3 were easier to remove (as shown by the low peel off forces required) in both cases the bonds formable after removal of the peel ply were more prone to cracking and/or crack propagation than the inventive Examples, as shown by the low G1c values. Similarly, while the material of Comparative example 4 had a reasonable peel off value, the bonds formable after removal of the peel ply were also more prone to cracking and/or crack propagation, as shown by the G1c values.

In contrast, the materials of Examples 1 and 2 were both relatively easy to remove (moderate peel off forces required) and produced excellent bonding surfaces after removal, both in terms of bond strength (fracture energy) and cleanliness of the bonding surface (absence of scraps) due to non-breakage of the peel ply during removal.

The invention claimed is:

1. An assembly (113) for composite manufacture, the assembly comprising:
   a resin impregnated reinforcement material (112) which is at least partially cured comprising a fibre component and a resin matrix component, in which the resin matrix component comprises polyurethane, the assembly having a length to width ratio of at least 5:1, and the assembly defining a longitudinal direction (L) along its length; and,
   a peel ply (116) in contact with the cured resin impregnated reinforcement material (112), the peel ply (116) comprising a woven layer having:
   a plurality of longitudinal fibres (118) extending in the longitudinal direction (L); and,
   a plurality of transverse fibres (120) extending in a transverse direction (T) normal to the longitudinal direction (L);
   in which the areal density of the plurality of transverse fibres (120) is higher than the areal density of the plurality of longitudinal fibres (118).

2. The assembly (113) according to claim 1, wherein the areal density of the plurality of transverse fibres (120) is at least from 10% to 40% greater than the areal density of the plurality of longitudinal fibres (118).

3. The assembly (113) according to claim 2, wherein there are a higher number of transverse fibres (120) per unit length in the longitudinal direction (DL) than the number of longitudinal fibres (118) per unit length in the transverse direction (DT).

4. The assembly (113) according to claim 3, wherein the ratio of the number of transverse fibres (120) per unit length in the longitudinal direction (DL) to the number of longitudinal fibres (118) per unit length in the transverse direction (DT) is from 1.3:1 to 1.15:1.

5. The assembly (113) according to claim 4, wherein the number of transverse fibres (120) in the longitudinal direction (L) is from 15 to 30 per 10 mm and/or wherein the number of longitudinal fibres (118) in the transverse direction (T) is from 15 to 30 per 10 mm.

6. The assembly (113) according to claim 5, wherein the linear density of the transverse fibres (120) is greater than the linear density of the longitudinal fibres (118).

7. The assembly (113) according to claim 6, wherein the linear density of the transverse fibres (120) is from 125 to 175%.

8. The assembly (113) according to claim 7, wherein the dtex of the transverse fibres (120) is from 150 to 400; and/or wherein the dtex of the longitudinal fibres (118) is from 150 to 400.

9. The assembly (113) according to claim 8 in which the longitudinal fibres (118) and/or the transverse fibres (120) of the peel ply (116) are formed from nylon or polyamide.

10. The assembly (113) according to claim 9, wherein the transverse fibres (120) are constructed from a different material to the longitudinal fibres (118).

11. The assembly (113) according to claim 10, wherein the longitudinal fibres (118) are warp fibres and the transverse fibres (120) are weft fibres.

12. The assembly (113) according to claim 11, in which the peel ply (116) is at least partially embedded in the matrix of the cured resin impregnated reinforcement material (112).

13. The assembly (113) according to claim 12, in which the assembly (113) is a pultruded product.

14. The assembly (113) according to claim 13, in which the average overall areal mass of the peel ply (116) is from 75 to 175 g/m2.

* * * * *